(12) United States Patent
Ricketts et al.

(10) Patent No.: US 10,003,089 B2
(45) Date of Patent: Jun. 19, 2018

(54) MULTILAYER COATING FOR CORROSION RESISTANT METAL BIPOLAR PLATE FOR A PEMFC

(71) Applicant: FORD GLOBAL TECHNOLOGIES, LLC, Dearborn, MI (US)

(72) Inventors: Mark Stephen Ricketts, Windsor (CA); Shinichi Hirano, West Bloomfield, MI (US); Jun Yang, Bloomfield Hills, MI (US); Kerrie K. Gath, Pittsfield, MI (US); Chunchuan Xu, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 14/619,642

(22) Filed: Feb. 11, 2015

(65) Prior Publication Data
US 2016/0233525 A1 Aug. 11, 2016

(51) Int. Cl.
*H01M 8/02* (2016.01)
*C23C 14/16* (2006.01)
*C23C 16/06* (2006.01)
*H01M 8/0228* (2016.01)
*H01M 8/021* (2016.01)
*H01M 8/026* (2016.01)

(52) U.S. Cl.
CPC ......... *H01M 8/0228* (2013.01); *H01M 8/021* (2013.01); *H01M 8/026* (2013.01)

(58) Field of Classification Search
CPC ............ H01M 8/0245; H01M 8/0232; H01M 8/0228; H01M 8/0217; H01M 8/0258; H01M 8/02; C23C 16/06; C23C 14/16
See application file for complete search history.

(56) References Cited

U.S. PATENT DOCUMENTS

| 7,553,517 B1 | 6/2009 | Jablonski et al. |
| 8,101,319 B2 | 1/2012 | Mikhail et al. |
| 8,182,963 B2 | 5/2012 | Abd Elhamid et al. |
| 8,232,026 B2 | 7/2012 | Kumar et al. |

(Continued)

FOREIGN PATENT DOCUMENTS

| CN | 101092688 A | 12/2007 |
| WO | 2013124690 A1 | 8/2013 |

*Primary Examiner* — Karie O'Neill Apicella
(74) *Attorney, Agent, or Firm* — James Dottavio; Brooks Kushman P.C.

(57) ABSTRACT

The present disclosure includes a fuel cell bipolar plate including a coating and methods for forming the coating. The bipolar plate may include a steel substrate and a coating contacting the steel substrate. The coating may include a plurality of alternating oxide-forming layers and elution resistant layers. The oxide-forming layers may include pure titanium, doped titanium, or a titanium alloy (e.g. doped/alloyed with niobium, zirconium, vanadium, silver, tantalum, yttrium, scandium, or nitrogen) and the elution resistant layers may include a noble metal or tantalum (e.g., gold, iridium, ruthenium, or tantalum). There may be 2-20 layers each of the oxide-forming layers and the elution resistant layers. The coating may prevent elution of iron ions from the steel substrate, for example, by forming oxide plugs in defects or pinholes in the oxide forming and/or elution resistant layers. The coating may also reduce the total usage of precious metals, such as gold.

20 Claims, 7 Drawing Sheets

(56) References Cited

U.S. PATENT DOCUMENTS

| | | |
|---|---|---|
| 8,268,466 B2 | 9/2012 | Takeuchi et al. |
| 8,592,098 B2 | 11/2013 | Jeon et al. |
| 8,623,301 B1 | 1/2014 | Deininger et al. |
| 8,778,562 B2 | 7/2014 | Balogh et al. |
| 8,778,566 B2 | 7/2014 | Jeon et al. |
| 8,859,164 B2 | 10/2014 | Shirvanian |
| 2003/0190515 A1 | 10/2003 | Brady et al. |
| 2006/0019142 A1 | 1/2006 | Abd Elhamid et al. |
| 2006/0032525 A1 | 2/2006 | Olsen et al. |
| 2006/0194095 A1 | 8/2006 | Vyas et al. |
| 2007/0243452 A1 | 10/2007 | Weidman et al. |
| 2007/0287057 A1* | 12/2007 | Elhamid .............. C23C 10/02 429/434 |
| 2008/0038625 A1* | 2/2008 | Abd Elhamid ......... C22B 7/007 429/49 |
| 2008/0076004 A1* | 3/2008 | Rodak .................. H01M 8/021 429/457 |
| 2008/0096078 A1 | 4/2008 | Miyake |
| 2008/0199767 A1 | 8/2008 | Sexton et al. |
| 2009/0130502 A1 | 5/2009 | Liu et al. |
| 2009/0317686 A1 | 12/2009 | Huston et al. |
| 2010/0035123 A1 | 2/2010 | Narayanan et al. |
| 2010/0330389 A1 | 12/2010 | Liu |
| 2011/0033784 A1 | 2/2011 | Ljungcrantz et al. |
| 2011/0165501 A1* | 7/2011 | Maeda ............... H01M 8/0206 429/518 |
| 2011/0229791 A1 | 9/2011 | Kageyama et al. |
| 2011/0287336 A1 | 11/2011 | Himeno et al. |
| 2012/0141919 A1 | 6/2012 | Lee |
| 2012/0231374 A1 | 9/2012 | Iseki et al. |
| 2013/0183602 A1 | 7/2013 | Benicewicz et al. |
| 2013/0230793 A1 | 9/2013 | Wang |
| 2016/0233523 A1 | 8/2016 | Koizumi et al. |

\* cited by examiner

FIG. 11

MULTILAYER COATING FOR CORROSION RESISTANT METAL BIPOLAR PLATE FOR A PEMFC

TECHNICAL FIELD

The present disclosure relates to multi-layer coatings for metal bipolar plates in PEMFCs, for example, stainless steel bipolar plates.

BACKGROUND

Fuel cells, for example, hydrogen fuel cells, are one possible alternative energy source for powering vehicles. In general, fuel cells include a negative electrode (anode), an electrolyte, and a positive electrode (cathode). In a proton exchange membrane fuel cell (PEMFC), the electrolyte is a solid, proton-conducting membrane that is electrically insulating but allows protons to pass through. Typically, the fuel source, such as hydrogen, is introduced at the anode using a bipolar or flow field plate where it reacts with a catalyst and splits into electrons and protons. The protons travel through the electrolyte to the cathode and the electrons pass through an external circuit and then to the cathode. At the cathode, oxygen in air introduced from another bipolar plate reacts with the electrons and the protons at another catalyst to form water. One or both of the catalysts are generally formed of a noble metal or a noble metal alloy, typically platinum or a platinum alloy.

The bipolar plates in the PEMFC have two primary functions. First, the bipolar plates feed reactant gases (e.g., hydrogen and air) to the membrane electrode assembly (MEA). Second, the bipolar plates collect current from the MEA. In order to collect current, the bipolar plates must be conductive or have a conductive coating. Typically, the bipolar plates are formed from a conductive carbon-based material, such as a carbon composite, which may be fabricated by a molding process.

SUMMARY

In at least one embodiment, a fuel cell bipolar plate is provided. The bipolar plate may include a metal substrate, a first oxide-forming layer contacting the metal substrate, a first elution resistant layer contacting the first oxide-forming layer, a second oxide-forming layer contacting the first elution resistant layer, and a second elution resistant layer contacting the second oxide-forming layer. The oxide-forming layers may include pure titanium, doped titanium, or a titanium alloy and the elution resistant layers may include a noble metal or tantalum.

In one embodiment, the oxide-forming layers include titanium that is doped or alloyed with one or more of niobium, zirconium, vanadium, silver, and nitrogen. In another embodiment, the elution resistant layers include one or more of gold, iridium, ruthenium, and tantalum. The metal substrate may include stainless steel. Each layer may have a thickness and the thickness of the first oxide-forming layer may be greater than the thickness of each other layer. In one embodiment, the first oxide-forming layer has a mean thickness of 5 to 100 nm and each other layer has a mean thickness of 0.5 to 20 nm.

The bipolar plate may further include a third oxide-forming layer contacting the second elution resistant layer and a third elution resistant layer contacting the third oxide-forming layer. The elution resistant layers may have defined therein a plurality of pinholes having a diameter of 0.1 to 50 nm. In one embodiment, the oxide-forming layers consist essentially of pure titanium, doped titanium, or a titanium alloy. In another embodiment, the oxide-forming layers are formed of at least 80 wt % titanium. The elution resistant layers may include at least 95 wt % of the noble metal or tantalum. In one embodiment, a combined thickness of the elution resistant layers is 8 nm or less.

In at least one embodiment, a fuel cell bipolar plate is provided. The bipolar plate may include a steel substrate and a coating contacting the steel substrate, the coating including a plurality of alternating oxide-forming layers and elution resistant layers. The oxide-forming layers may include pure titanium, doped titanium, or a titanium alloy and the elution resistant layers may include a noble metal or tantalum.

In one embodiment, there are 2 to 20 layers each of the oxide-forming layers and the elution resistant layers. A first oxide-forming layer in the plurality of alternating layers may contact the steel substrate and have a mean thickness of 5 to 100 nm and each other layer may have a mean thickness of 0.5 to 20 nm. In one embodiment, the oxide-forming layers include titanium that is doped or alloyed with one or more of niobium, zirconium, vanadium, silver, tantalum, yttrium, scandium, and nitrogen.

In at least one embodiment, a method of forming a multi-layer coating on a fuel cell bipolar plate is provided. The method may include applying a plurality of alternating layers of an oxide-forming material and an elution resistant material to a metal substrate. The oxide-forming layers may include pure titanium, doped titanium, or a titanium alloy and the elution resistant layers may include a noble metal or tantalum.

In one embodiment, 2 to 20 layers each of the oxide-forming material and the elution resistant material are applied to the substrate. The oxide-forming material may include titanium that is doped or alloyed with one or more of niobium, zirconium, vanadium, silver, tantalum, yttrium, scandium, and nitrogen and the elution resistant material may include one or more of gold, iridium, ruthenium, and tantalum. In one embodiment, a first layer of the plurality of alternating layers includes the oxide-forming material and is deposited with a mean thickness of 5 to 100 nm and each subsequent layer is deposited with a mean thickness of 0.5 to 20 nm.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
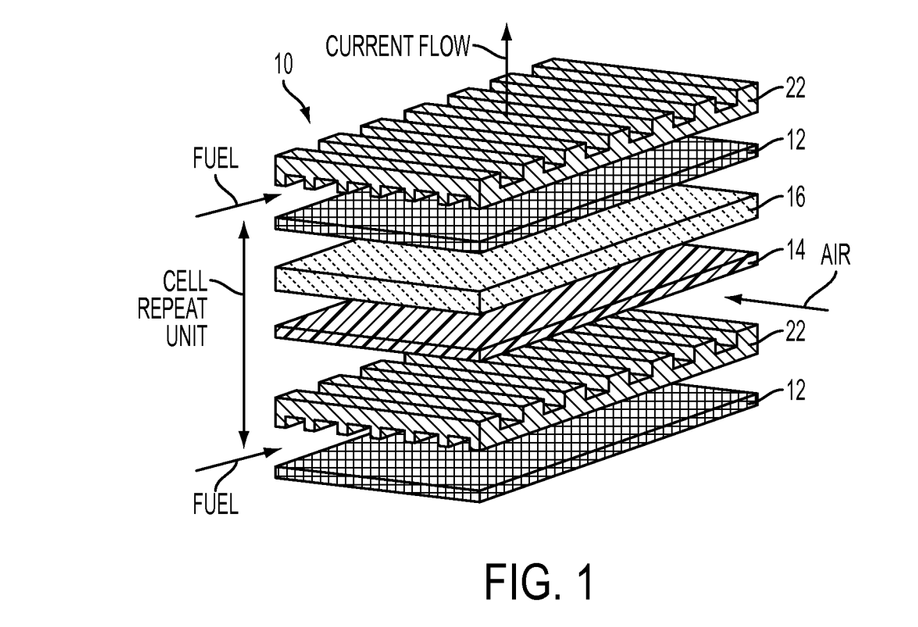
FIG. 1 is an exploded view of the components of a fuel cell.
Figure 2:
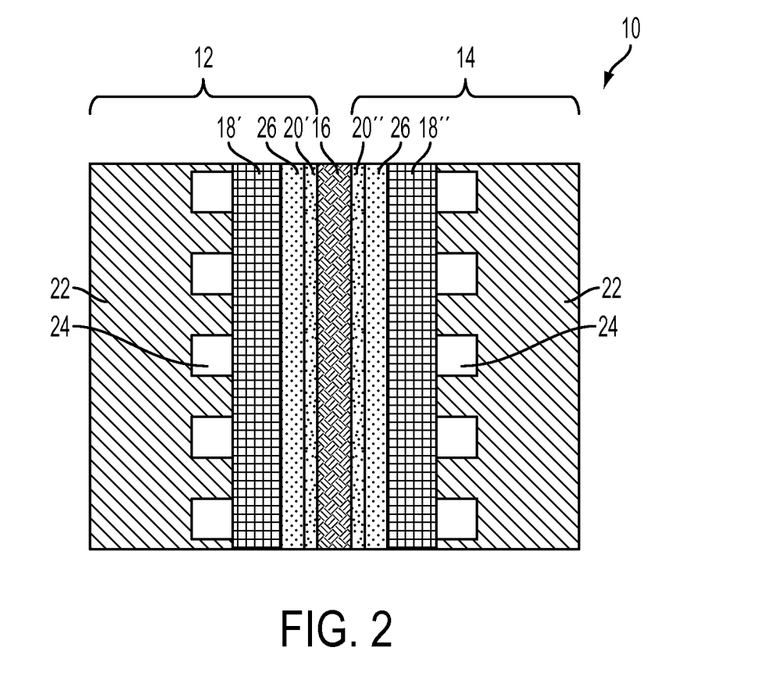
FIG. 2 is a schematic cross-section of a fuel cell.

With reference to FIGS. 1 and 2, an example of a PEMFC 10 is illustrated. The PEMFC 10 generally includes a negative electrode (anode) 12 and a positive electrode (cathode) 14, separated by a proton exchange membrane (PEM) 16 (also a polymer electrolyte membrane). The anode 12 and the cathode 14 may each include a gas diffusion layer (GDL) 18, a catalyst layer 20, and a bipolar or flow field plate 22 which forms a gas channel 24. The catalyst layer 20 may be the same for the anode 12 and the cathode 14, however, the anode 12 may have a catalyst layer 20' and the cathode 14 may have a different catalyst layer 20". The catalyst layer 20' may facilitate the splitting of hydrogen atoms into hydrogen ions and electrons while the catalyst layer 20" facilitates the reaction of oxygen gas and electrons to form water. In addition, the anode 12 and cathode 14 may each include a microporous layer (MPL) 26 disposed between the GDL 18 and the catalyst layer 20.

The PEM 16 may be any suitable PEM known in the art, such as a fluoropolymer, for example, Nafion (a sulfonated tetrafluoroethylene based fluoropolymer-copolymer). The GDL 18 may be formed of materials and by methods known in the art. For example, the GDL 18 may be formed from carbon fiber based paper and/or cloth. GDL materials are generally highly porous (having porosities of about 80%) to allow reactant gas transport to the catalyst layer (which generally has a thickness of about 10-15 μm), as well as liquid water transport from the catalyst layer. GDLs may be treated to be hydrophobic with a non-wetting polymer such as polytetrafluoroethylene (PTFE, commonly known by the trade name Teflon). An MPL may be coated to the GDL side facing the catalyst layer to assist mass transport. The MPL may be formed of materials and by methods known in the art, for example, carbon powder and a binder (e.g., PTFE particles). The catalyst layer 20 may include a noble metal or a noble metal alloy, such as platinum or a platinum alloy. The catalyst layer may include a catalyst support, which may support or have deposited thereon a catalyst material layer.

The bipolar plates 22 may have channels 24 defined therein for carrying gases. The channels 24 may carry air or fuel (e.g., hydrogen). As shown in FIG. 1, the plates 22 and channels 24 may be rotated 90 degrees relative to each other. Alternatively, the plates 22 and channels may be oriented in the same direction. Bipolar plate materials need to be electrically conductive and corrosion resistant under proton exchange membrane fuel cell (PEMFC) operating conditions to ensure that the bipolar plate perform its functions—feeding reactant gases to the membrane electrode assembly (MEA) and collecting current from the MEA.

Currently, carbon-based bipolar plates are the most commonly used. However, metal bipolar plates may offer several advantages over carbon-based plates. The use of metal may enable bipolar plates to be thinner, which may reduce the size of the fuel cell stack. In addition, it may enable the manufacturer to take advantage of high volume manufacturing processes, such as stamping, corrugated rolling, or others, which may reduce the cost of fuel cell stack. Metal bipolar plates may have disadvantages, as well, however. One issue that affects metal bipolar plates is the leaching or elution of elements from the metal into the fuel cell during operation.

A metal that has been proposed for use in bipolar plates is stainless steel. Stainless steel is a low-cost, high strength, and readily available material. However, bare stainless steel alloys may form insulating passive layers under fuel cell operating conditions, resulting in higher surface electrical resistance. Therefore, to make stainless steel a practical substrate for bipolar plates, either corrosion resistant and electrically conductive coatings or particles must be applied to the stainless steel plate. A main obstacle to the use of stainless steel as the bi-polar plate is that the constituents of the stainless steel substrate (e.g., Fe ions) may slowly elute out through coating defects during fuel cell operation. One of the most common coating defects is pinholes, or small point-defects (voids, gaps, openings) having a size of about several angstroms to tens of nanometers. The eluted metal ions (e.g., cations) may poison or contaminate the fuel cell stack components (such as the MEA). For example, some transition metal ions, such as ferric ions ($Fe^{+2}$ and $Fe^{+3}$), may react with hydrogen peroxide (a by-product of the oxygen reduction reaction (ORR)) in PEMFCs to form radicals. Radicals may then chemically attack the membrane materials, which may affect the performance and/or longevity of the fuel cell. Iron is the main elemental component of stainless steel, therefore, elution of iron may be problematic. Examples of reactions with ferric ions to produce radicals are shown in reactions (1) and (2) below:

$$Fe^{+2} + H_2O_2 \rightarrow Fe^{+3} + HO\cdot + OH^- \qquad (1)$$

$$Fe^{3+} + H_2O_2 \rightarrow Fe^{+2} + HOO\cdot + H^+ \qquad (2)$$

Several approaches have been taken to coat stainless steel (SS) bipolar plates in order to mitigate the elution of iron and other elements. One approach is to coat the SS plate with a layer of gold (Au). However, pinholes will almost always exist during film processing, requiring that the layer be relatively thick (e.g., at least 10 nm). Gold is expensive, therefore, using thicker layers is not desirable. In addition, gold is soft, so a 10 nm layer may be easily scratched during the assembly of the fuel cell, reducing or eliminating the effectiveness of the coating. Furthermore, it has been found that the gold layer may change its morphology during corrosion testing, forming spheres or globules. Another approach is to coat the SS plate with a layer of conductive metal oxide anchored with gold or iridium (Ir) nano-dots. However, the metal oxides are about 250 nm thick, which, when combined with the Au/Ir nano-dots, leads to reduced electrical conductivity.

Accordingly, there are still significant problems or hurdles to the use of metal bipolar plates, such as stainless steel plates. The present disclosure describes a metal bipolar plate including a multi-layered coating, as well as methods for forming the multi-layered coating. The disclosed coating may reduce or eliminate elution by blocking pinholes, have improved strength and toughness compared to conventional bipolar plates, and/or reduce the materials and processing cost of the bipolar plates.

Figure 3:
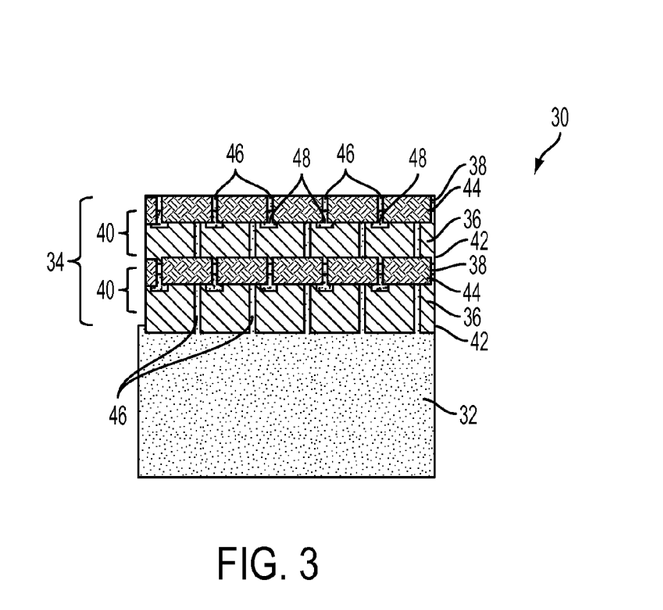
FIG. 3 is a schematic cross-section of a bipolar plate having a multi-layer coating, according to an embodiment.
Figure 4:
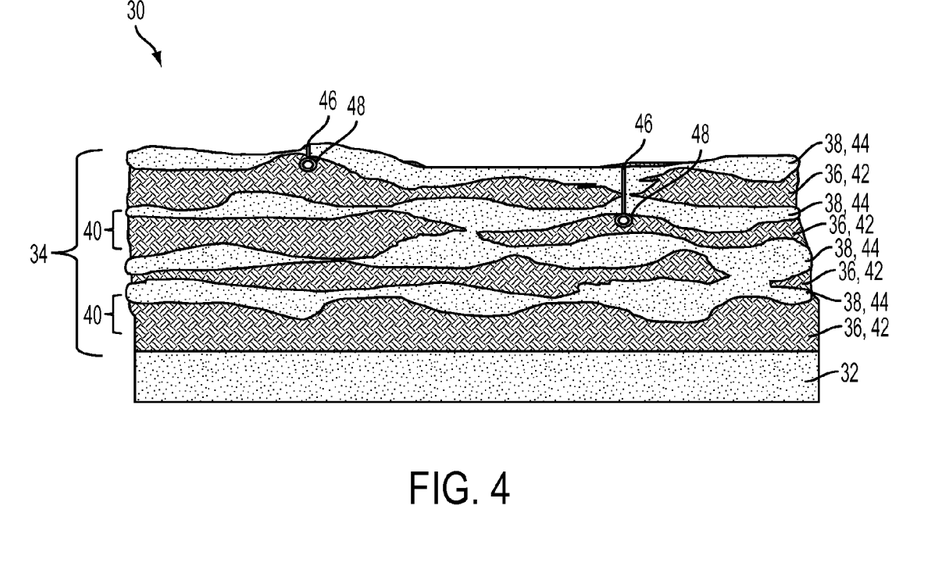
FIG. 4 is a schematic cross-section of a bipolar plate having a multi-layer coating, according to another embodiment.

With reference to FIGS. 3 and 4, schematic cross-sections of a metallic bipolar plate 30 having a substrate 32 and a multi-layer coating 34 formed thereon is shown. FIG. 3 shows a more schematic or idealized coating having very uniform and consistent layer thicknesses. While extremely consistent layer thicknesses are certainly feasible and within the scope of the disclosed coating 34, it may not be necessary due, at least in part, to the disclosed multiple layers and material selection. FIG. 4 shows an embodiment of a coating with less uniform or consistent layer thicknesses. Coatings having less stringent thickness uniformity may allow for less restrictive deposition processes or controls, which may make the coating process faster, cheaper, and/or more robust. The self-healing or plugging properties of the coating 34, described in additional detail below, may allow for more flexibility in the layer thicknesses, since defects may be filled in situ and multiple layers may provide several levels of redundant protection.

Whiles FIGS. 3 and 4 show the multi-layer coating 34 only on a top surface of the substrate 32, the bottom surface of the substrate 32 may also have a multi-layer coating 34 formed thereon. The substrate 32 may be formed of any metal suitable for use in bipolar plates. In one embodiment, the substrate 32 is formed of steel, which may be a stainless steel, such as austenitic stainless steel (e.g., 301, 303, 304, 316 or 316L). In another embodiment, the substrate 32 may be formed of a different metal, such as titanium or aluminum, or oxides or alloys thereof. Non-limiting examples of alloying elements in a titanium alloy substrate may include one or more of niobium (Nb), nitrogen (N), zirconium (Zr), tantalum (Ta), Vanadium, and silver (Ag).

The multi-layer coating 34 may include a first layer 36 and a second layer 38. The first and second layers 36, 38 may repeat to form alternating layers. FIG. 3 shows two sets 40 of alternating layers and FIG. 4 shows four sets 40 of alternating layers. However, more than two or four sets 40 may be included in the multi-layer coating 34. For example, 3, 5, 8, 10, or more sets 40 may be included. In one embodiment, there are from 2 to 20 of each layer in the multilayer coating 34, or any sub-range therein, such as 2 to 16, 2 to 10, 2 to 8, 2 to 6, or 2 to 4. The top or final layer in the multi-layer coating 34 may be either a first layer 36 or a second layer 38 (e.g., there may be an even or odd number of total layers), however, in at least one embodiment, the final layer is a second layer 38 (e.g., gold).

In one embodiment, the layers of each type (e.g., each first layer 36 or second layer 38) may have the same or substantially the same thickness. As described above with respect to FIG. 4, the thickness of each layer may vary throughout the layer. Therefore, layer thickness may also be defined as a mean or average thickness. Accordingly, unless otherwise stated, thicknesses described in the present disclosure may be absolute or may be a mean or average. In another embodiment, all of the layers (e.g., both first and second layers) may have the same thickness. A bottom or initial and/or a top or final layer (either layer 36 or 38) may have a different thickness than the other layers, either thicker or thinner. For example, the first and second layers 36, 38 may all have substantially the same thickness in the coating 34, except that the initial layer (e.g., the first layer 36 in contact with the substrate 32) may have a larger (or smaller) thickness than the other layers. In one embodiment, the first layers 36 and/or second layers 38 may each have a thickness of 0.1 to 50 nm, or any sub-range therein. For example, the layers may each have a thickness of 0.5 to 40 nm, 0.5 to 20 nm, 0.5 to 10 nm, 1 to 8 nm, 1 to 6 nm, 1 to 4 nm, or about 2 nm (e.g., +/−1 nm). In at least one embodiment, a total thickness of the combined second layers 38 may be less than 20 nm. For example, the total thickness of the second layers may be 15 nm or less, 10 nm or less, 8 nm or less, 6 nm or less, or 4 nm or less.

As described above, one layer (e.g., an initial or a final layer) may have a thickness that is larger or smaller than the other layers in the stack. For example, the initial or final layer may have a thickness of 5 to 100 nm, or any sub-range therein, such as 5 to 75 nm, 15 to 75 nm, 20 to 60 nm, 20 to 50 nm, 20 to 40 nm, or about 30 nm (e.g., +/−5 nm). The initial layer may act as an adhesion layer and the increased thickness may reduce the probability of the initial second layer 38 (e.g., gold) from contacting the substrate (which may have a pinhole and allow elution). A total thickness of the multi-layer coating 34 may be 100 nm or less, such as 75 nm or less or 60 nm or less. In one embodiment, the total thickness of the coating 34 is from 5 to 100 nm, or any sub-range therein. The total thickness may be from 10 to 75 nm, 15 to 75 nm, 30 to 75 nm, 40 to 75 nm, or 40 to 50 nm. In one example, each first and second layer may be about 2 nm thick, except for the initial first layer 36, which may be about 30 nm. In this example, if there are four of each layer, the total average thickness is about 44 nm. If there are three of each layer, the total average thickness would be about 40 nm.

The layers of the coating 34 may include an oxide-forming material 42 and an elution or corrosion resistant material 44. The elution resistant material may also be electrically conductive. In one embodiment, the first layers 36 may include the oxide-forming material and the second layers 38 may include the elution resistant material. In other embodiments the layers may be reversed, however, the coating will hereinafter be described with the first layers 36 including the oxide-forming material and the second layers 38 including the elution resistant material. The first layers 36 may consist only of or consist essentially of the oxide-forming material 42 (e.g., only trace amounts of other elements or materials) and the second layers 38 may consist only of or consist essentially of the elution resistant material 44 (e.g., only trace amounts of other elements or materials).

The oxide-forming material 42 may be a material that forms a conductive oxide. The material 42 may form an oxide when exposed to oxygen, for example, via air introduced at the cathode. The oxide formed may be a passive oxide, such that it has good adhesion and does not continue oxidizing the material indefinitely (unless the passivation layer is damaged). In one embodiment, the oxide-forming material 42 includes titanium, a titanium alloy, or doped titanium. Non-limiting examples of alloying and/or dopant elements in the oxide-forming material 42 may include one or more of niobium (Nb), nitrogen (N), zirconium (Zr), vanadium (V), tantalum (Ta), yttrium (Y), scandium (Sc) and silver (Ag). The oxide-forming material 42 may consist essentially of pure titanium, doped titanium, or a titanium alloy, wherein the dopant/alloying elements include Nb, N, Zr, V, Ta, Y, Sc, and/or Ag (e.g., containing only trace amounts of other elements). The oxide-forming material 42 may be formed mostly (e.g., over 50%) of titanium, by weight. For example, the oxide-forming material 42 may be formed of at least 60, 70, 75, 80, 85, 90, 95, 98, or 99 wt % titanium. In one embodiment, the oxide-forming material 42 may be substantially a binary alloy including titanium and one other element, selected from those described above, or a ternary alloy including titanium and two other elements, selected from those described above. In another embodiment, the oxide-forming material 42 may be a metallic alloy, such that it includes substantially only metals (e.g., not a carbide or nitride).

In at least one embodiment, the oxide-forming material 42 includes alpha-phase titanium. The oxide-forming material 42 may be single phase (e.g., alpha-only Ti), substantially a single phase (e.g., near-alpha Ti), or have two or more phases (e.g., alpha and beta Ti). In general, single phase or alpha titanium includes a relatively low amount or concentration of dopants or alloying elements, while dual phase (e.g., alpha plus beta) titanium has a higher amount or concentration of dopants or alloying elements. Alpha phase titanium is a solid solution alloy of titanium and alloying elements and having an HCP crystal structure. Beta phase titanium is a BCC structured alloy of titanium and alloying elements, with the amount of alloying elements generally being greater than that of alpha phase titanium. The amount of dopant that may be present and still having only alpha Ti may vary depending on the dopant. In general, the alpha phase may only be able to include several at % (e.g., less than 5 at %, such as 2-3 at %) of dopants. In one embodiment, the oxide-forming material 42 may have a total concentration of dopants or alloying elements of 10 at % or less, for example, 7, 5, 3, 2, or 1 at % or less. Stated as ranges, the oxide-forming material 42 may include a total concentration of dopants or alloying elements of 0.01 at % to 10 at %, or any sub-range therein, such as 0.01 at % to 7.5 at %, 0.01 at % to 5 at %, 0.01 at % to 4 at %, 0.01 at % to 3 at %, 0.01 at % to 2 at %, 0.01 at % to 1 at %, 0.1 at % to 5 at %, 0.1 at % to 3 at %, 0.1 at % to 2 at %, 1 at % to 5 at %, 1 at % to 3 at %, 2 at % to 3 at %, or other sub-ranges.

The balance of the oxide-forming material may be titanium. In one embodiment, the dopants or alloying elements forming the total concentration may be any combination of Nb, N, Zr, V, Ta, Y, Sc, and/or Ag (e.g., one dopant, any two, any three, etc.). The above concentrations may also apply to any single dopant or alloying element. For example, niobium may be present at a concentration of 0.01 at % to 10 at %, or any sub-range therein, such as 0.01 at % to 7.5 at %, 0.01 at % to 5 at %, 0.01 at % to 4 at %, 0.01 at % to 3 at %, 0.01 at % to 2 at %, 0.01 at % to 1 at %, 0.1 at % to 5 at %, 0.1 at % to 3 at %, 0.1 at % to 2 at %, 1 at % to 5 at %, 1 at % to 3 at %, or 2 at % to 3 at %. Doped titanium alloys, such as Nb-doped Ti, may form a conductive oxide, when exposed to oxygen, that has a higher conductivity (lower resistance) compared to titanium oxide. Using a higher conductivity oxide-forming material may therefore increase the overall conductivity of the multi-layer 34. In addition to titanium, other materials that form an oxide, for example a conductive oxide, may be used as the base metal for the oxide-forming material 42. For example, tungsten (W), niobium (Nb), tantalum (Ta), or molybdenum (Mo) may be used as the base material, or combinations or alloys thereof.

The elution resistant material 44 may include a metal, such as a noble metal, or tantalum. In one embodiment, the elution resistant material includes one or more of pure or metallic gold (Au), iridium (Ir), ruthenium (Ru), or tantalum (Ta), or alloys thereof. However, other noble or inert/non-reactive metals, or alloys thereof, may be used. In one embodiment, the elution resistant material 44 is a metal or a metal alloy (e.g., containing only trace amount of non-metallic elements). The elution resistant material 44 may consist essentially of a noble metal or tantalum. For example, the elution resistant material 44 may be a pure or metallic noble metal or tantalum, or a binary, ternary, or quaternary alloy thereof. In one embodiment, the elution resistant material 44 includes at least 80, 85, 90, 95, 98, or 99 wt % of the noble metal(s) or tantalum.

As described above, pinholes are practically impossible to avoid when depositing thin layers of materials. Accordingly, corrosion protective coatings that include a single layer either still contain some pinholes through which elution can occur or the coatings much be made very thick or combined with one additional layer that is very thick. Making a thick gold layer is very expensive and also results in a soft protective layer than can easily be scratched during fuel cell assembly, reducing its effectiveness. Adding an additional thick layer (e.g., over 100 nm), such as a metal oxide, to a layer of gold may increase the resistivity of the coating to an unacceptable level. However, it has been discovered that by applying or depositing multiple, alternating layers of an oxide-forming material 42 and an elution resistant material 44, pinholes may be sufficiently plugged or blocked and the total amount of coating material can be reduced.

As shown in FIGS. 3 and 4, pinholes 46 (e.g., small gaps, voids, defects, or openings) may still be formed in each layer 36 and 38, since pinholes are difficult or impossible to eliminate from thin (e.g., 5 nm or less) films or layers. However, pinholes are generally formed in a random or inconsistent pattern in each layer. The pinholes 46 may have a diameter or width of 0.1 to 50 nm. Therefore, by forming a coating 34 having a plurality of sets 40 of first and second layers 36 and 38, the pinholes 46 in each layer may be shifted in each layer such that it is extremely likely that the pinhole from one layer is covered by an adjacent layer. Accordingly, substantially none of the pinholes 46 line up with a pinhole in another layer to form a channel through which eluted ions could escape. In embodiments having layers with varying thicknesses, such as shown in FIG. 4, the multiple layers may also mitigate or eliminate the impact of a layer having a very thin region or an open or missing area of the layer. For example, FIG. 4 shows a pinhole 46 that extends through two elution resistant layers and a very thin portion of an oxide forming layer. The multiple layers provide redundant levels of protection, however, and the pinhole is plugged by the next oxide forming layer.

In addition to being physically blocked by the layer above and/or below the pinhole 46, the oxide-forming material 42 (shown as the first layers 36) may form an oxide plug 48 in the pinholes 46 in the elution resistant material 44 (shown as the second layer 38) when exposed to oxygen. Therefore, as shown in FIGS. 3 and 4, each pinhole 46 in the second layers 38 (e.g., Au, Ir, Ru, or Ta) may be plugged or sealed by an oxide plug 48. These plugs 48 may reduce or prevent further oxidation of the substrate 32 (e.g., stainless steel) and may reduce or prevent ions eluted from the substrate from entering or contaminating the fuel cell components. In at least one embodiment, the plugs 48 are formed of a conductive oxide, such as a Ti—Nb, Ti—N, Ti—Zn, Ti—V, or Ti—Ag oxide. The plugs 48 may therefore prevent elution while also still providing conductivity to the multi-layer coating 34.

Since the pinholes in the elution resistant material 44 may be plugged by the oxide-forming material, the thickness of the elution resistant material 44 may be reduced without worrying about increased elution or oxidation. Accordingly, the second layers 38 may be very thin (e.g., 6, 4, 2 or less nm), but still effective. By reducing the thickness of the second layers 38, the amount of total elution resistant material 44 may also be reduced. Since noble metals, such as gold, are very expensive, reducing the total amount of material 44 used may result in a significant cost savings. In addition, forming multiple thin layers of the elution resistant material 44 avoids the problems associated with thick layers of, for example, gold that are soft and easy to scratch. By using thin first layers 36, in addition to thin second layers 38, the total thickness of the coating 34 may be reduced. A thinner overall coating 34 may reduce the resistivity of the coating and provide improved performance to the fuel cell.

Figure 5:
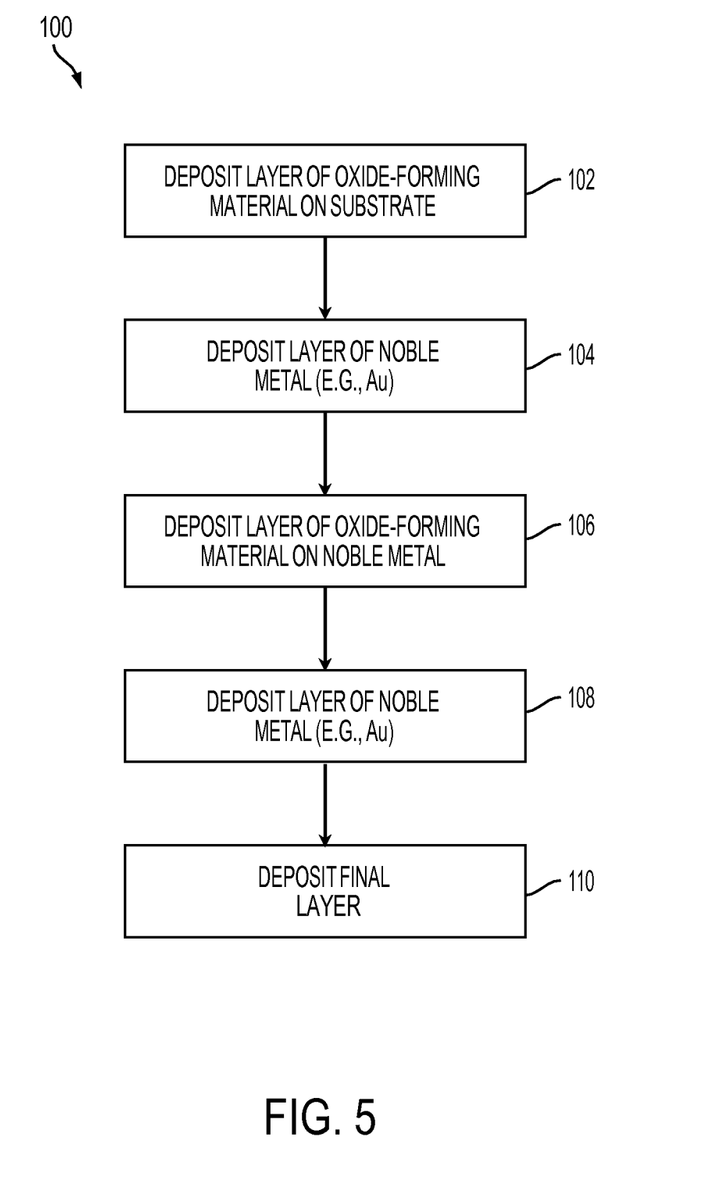
FIG. 5 is a flowchart of a method of forming a multi-layer coating on a bipolar plate, according to an embodiment.

With reference to FIG. 5, a flowchart for a method 100 of forming the disclosed multi-layer coating is provided. In step 102, a layer of oxide-forming material is deposited on the metal substrate. As described above, the substrate may stainless steel or other suitable metals. The oxide-forming material may be any of those described above, such as titanium, a titanium alloy, or doped titanium. The layer or coating of the oxide-forming material may be applied or deposited using any suitable method known in the art, such as chemical or physical vapor deposition (CVD or PVD). Non-limiting examples of CVD processes that may be suitable include atmospheric, vacuum, aerosol assisted, plasma assisted, wet chemical, atomic layer CVD, CCVD, or others. Non-limiting examples of PVD processes that may be suitable include cathodic arc deposition, electron beam physical vapor deposition, evaporative deposition, pulsed laser deposition, sputter deposition (e.g., magnetron), or others. In at least one embodiment, magnetron sputtering may be used to deposit the oxide-forming material.

If the oxide-forming material is an alloy or a doped material, the alloying element(s) or dopant(s) may be incorporated into the base material (e.g., titanium) using any suitable method. In deposition techniques including a single cathode or target material, the target may be formed of the desired composition or the target may be formed of the base material (e.g., titanium) and a reactive atmosphere may be used to form the desired composition. Deposition techniques including multiple cathode or target materials may also be used to include the alloying element(s) or dopant(s), for example, by including a target of the base material and one or more targets of the alloying/dopant element(s). In one embodiment, the alloying element(s) or dopant(s) may be co-sputtered onto the substrate 32 along with the base material (e.g., by magnetron sputtering). The alloying element(s) or dopant(s) may also be added using other doping techniques known in the art. For example, the alloying element(s) or dopant(s) may be diffused into the base material from a gas, liquid, or solid. In one embodiment, separate layers of the base material and the alloying element(s) or dopant(s) may be deposited and then heat treated to diffuse into one another. The alloying element(s) or dopant(s) may also be added using ion implantation. Other methods, such as CVD epitaxy and other techniques used in, for example, semiconductor doping processes may also be used.

In step 104, an elution resistant material, such as a noble metal, is deposited onto the layer of oxide-forming material deposited in step 102. As described above, the elution resistant material may be a noble metal, such as Au, Ir, or Ru, or Ta (or alloys thereof). The layer of elution resistant material may be applied or deposited using any suitable method known in the art, such as CVD or PVD. The process may the same one used in step 102 or it may be different, depending on the materials being deposited. Similar to step 102, the CVD or PVD process may include those known in the art, such as those listed above.

In step 106, another layer of oxide-forming material is deposited, this time onto the elution resistant material deposited in step 104. The oxide-forming material may be the same material from step 102 or it may be another oxide-forming material. The process may the same one used in step 102 or it may be different, depending on the materials being deposited. Similar to step 102, the CVD or PVD process may include those known in the art, such as those listed above. In step 108, another layer of elution resistant material is deposited onto the oxide-forming material deposited in step 106, using the same or a different process as step 104. The elution resistant material may be the same material deposited in step 104, or it may be a different elution resistant material.

After step 108, the process may repeat steps 106 and 108 one or more times until a desired number of sets of layers are formed. As described above, the multi-layer coating may include a plurality of sets, such as 2, 3, 4, 5, 6, or more. Once the process has been repeated to produce one less than the final number of layers, the last layer may be deposited in step 110. As described above, the last or final layer may be either an oxide-forming material (e.g., odd number of total layers) or an elution resistant material (e.g., even number of total layers). The final layer may be deposited using a suitable method, such as those described above.

Accordingly, bipolar plates including a metal substrate and a multi-layer coating are disclosed. The metal substrate may be steel (e.g.) stainless steel and the multi-layer coating may include alternating layers of an oxide-forming material and an elution or corrosion resistant material. The elution resistant layers may be very thin (e.g., under 5 nm), which may reduce the total amount of the elution resistant material included in the coating. Since the elution resistant material may include noble or precious metals, such as gold, this reduction reduces the overall cost of the coating. The use of a thin layer of elution resistant material is counterintuitive, and cuts against the conventional thinking in bipolar plate coatings, due to the formation of pinholes therein during deposition that may allow oxidation of the substrate underneath. However, it has been discovered that by depositing alternating layers of an oxide-forming material and thin layers of the elution resistant material, the pinholes that are formed may be blocked by an oxide plug that is formed when oxygen encounters the oxide-forming material layer(s). Therefore, a plurality of imperfect layers may be combined to form an extremely corrosion resistant multi-layer coating that is highly effective at preventing oxidation or elution of the steel substrate and also reduces the total quantity of costly materials (e.g., gold).

Figure 6:
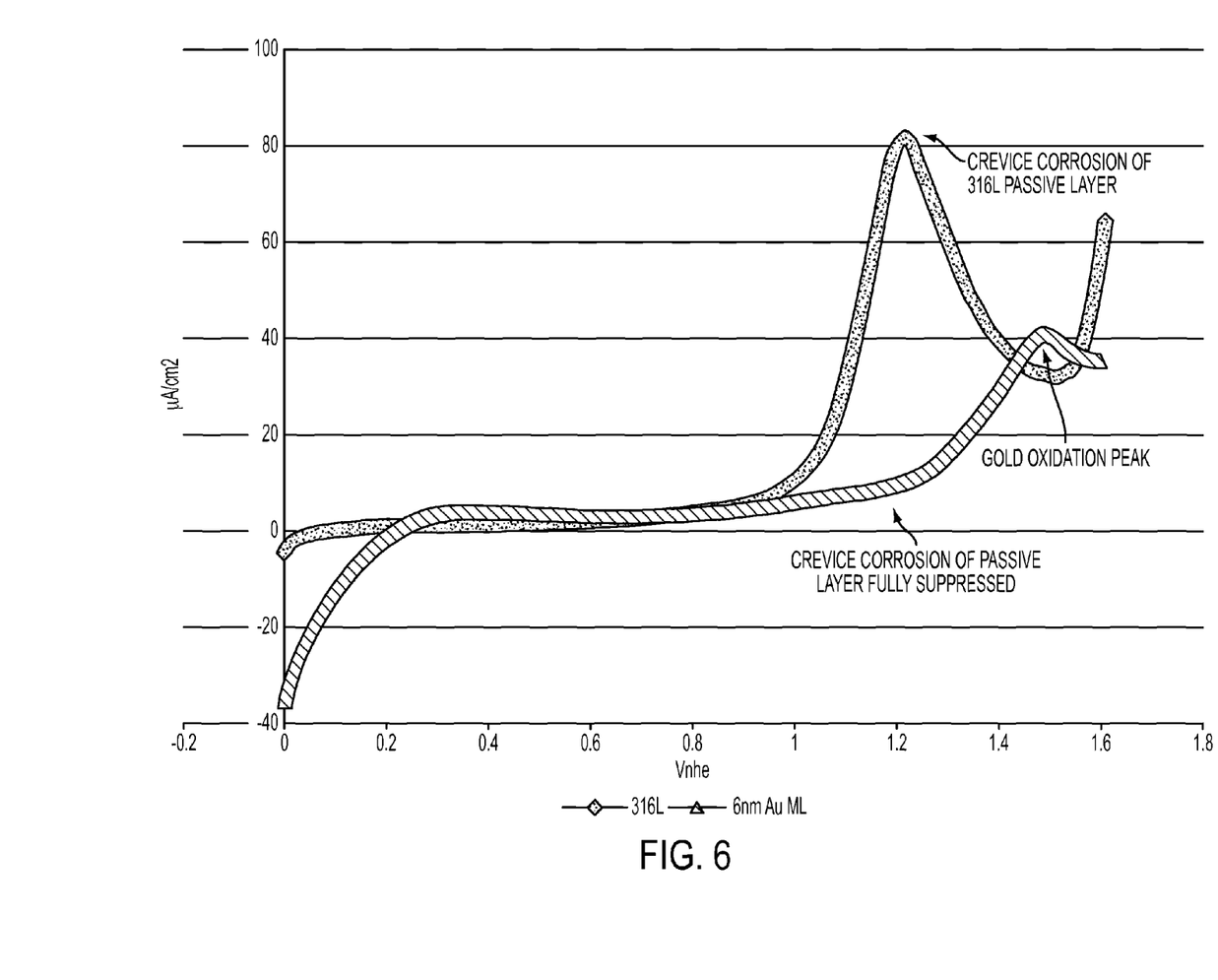
FIG. 6 is experimental data from cyclic voltammetry tests of a bipolar plate having a multi-layer coating and an uncoated steel substrate.

With respect to FIG. 6, the results of cyclic-voltammetry tests are shown for a 316L stainless steel plate having a disclosed multi-layer coating formed thereon, as well for an uncoated 316L stainless steel plate. The stainless steel plates had a thickness of 0.13 mm and the coated plate was coated on both sides with a multi-layer coating. The multi-layer coating had a first layer of pure or metallic titanium having a thickness of 30 nm. A second layer of pure or metallic gold having a thickness of 2 nm was deposited onto the first titanium layer. Two sets of alternating layers of Ti and Au were then deposited onto the second layer of gold, each layer having a thickness of 2 nm. The layers were deposited using magnetron sputtering. Therefore, a multi-layer coating having three layers each of titanium and gold was formed on each side of the SS substrate. The first Ti layer had an average thickness of 30 nm and all other layers had an average thickness of 2 nm. The layers alternated Ti—Au, starting with Ti and ending with Au. Accordingly, despite the multi-layer coating having three layers of gold, the total average thickness of gold was only 6 nm (three layers of 2 nm), which is less than the amount used in single-layer coatings. Total gold usage (and cost) could be further reduced by reducing the number of layers and/or the thickness of the layers. Due to the formation of the oxide plugs, the presence of pin holes in the thinner gold layers is of little to no concern.

Figure 7:
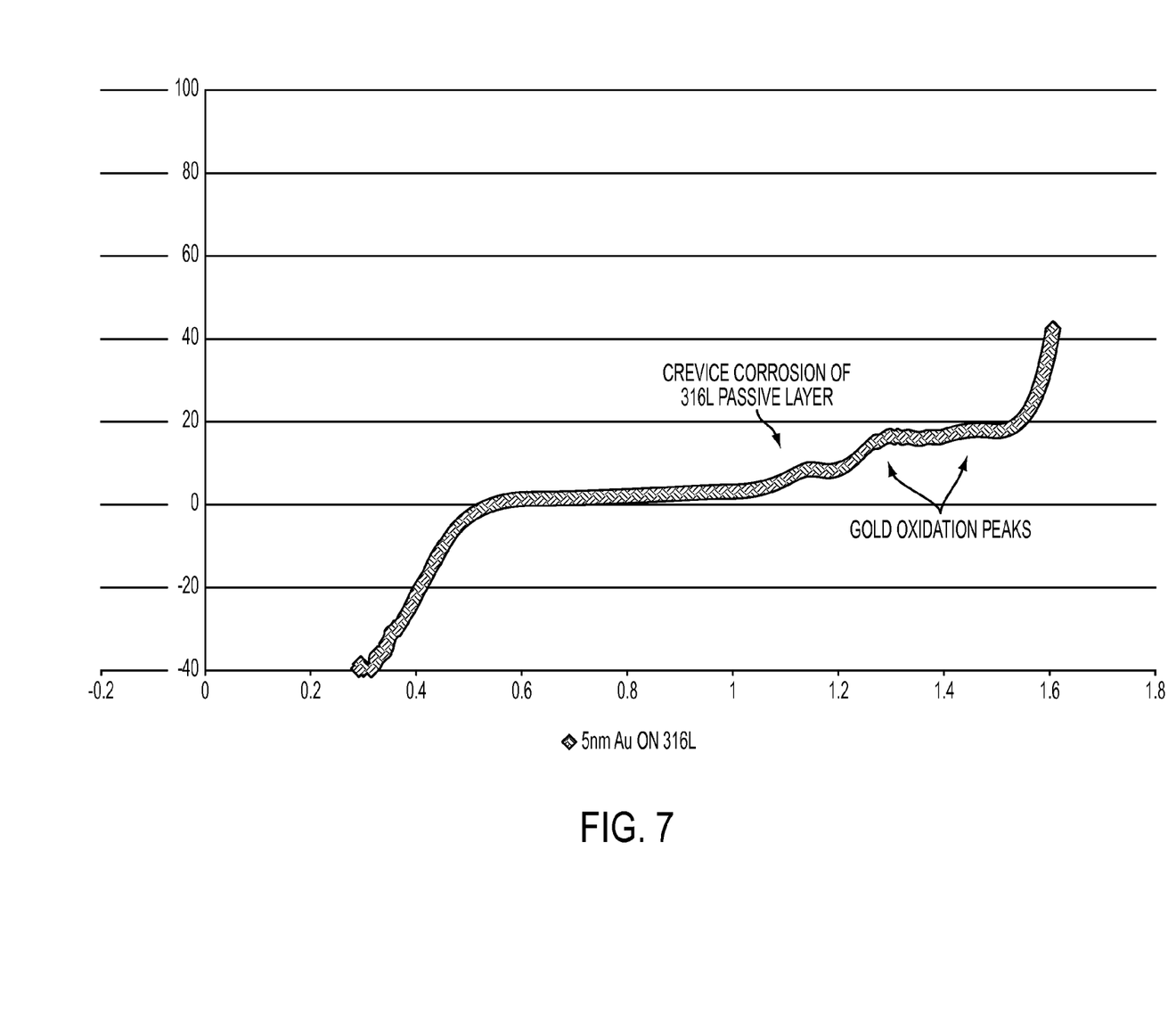
FIG. 7 is experimental data from a cyclic voltammetry test of a bipolar plate having a gold coating.

The cyclic-voltammetry test was conducted using an air sparge at 80° C. in a $H_2SO_4$ solution having a pH of 3 and bubbling air at 100 ml/min. The CV cycle was from 0 to 1.6V with respect to the normal hydrogen electrode [Vnhe] at a scan rate of 5 mV/s. The surface area of the sample presented to the solution was 1 cm$^3$. A characteristic corrosion peak associated with 316L is visible at about 1.2 Vnhe for the uncoated 316L substrate. However, the CV test shows that the multi-layer coating is extremely stable and corrosion resistant, as evidenced by the suppression of the 316L corrosion peak. A CV test for a 5 nm gold coating on a 316L stainless steel plate is shown in FIG. 7, for comparison. In contrast to the CV data for the multi-layer coating, the CV test for the 5 nm gold coating shows a bump in the current at around 1.15 Vnhe, which is indicative of the steel substrate being oxidized. FIGS. 6 and 7 show the forward traces from the third forward CV.

Figure 8:
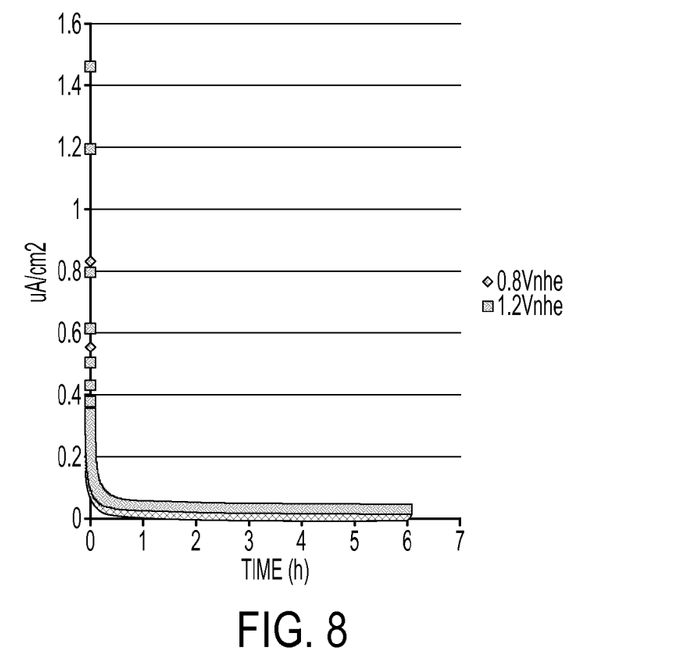
FIGS. 8 and 9 are corrosion current tests of a bipolar plate having a multi-layer coating.
Figure 9:
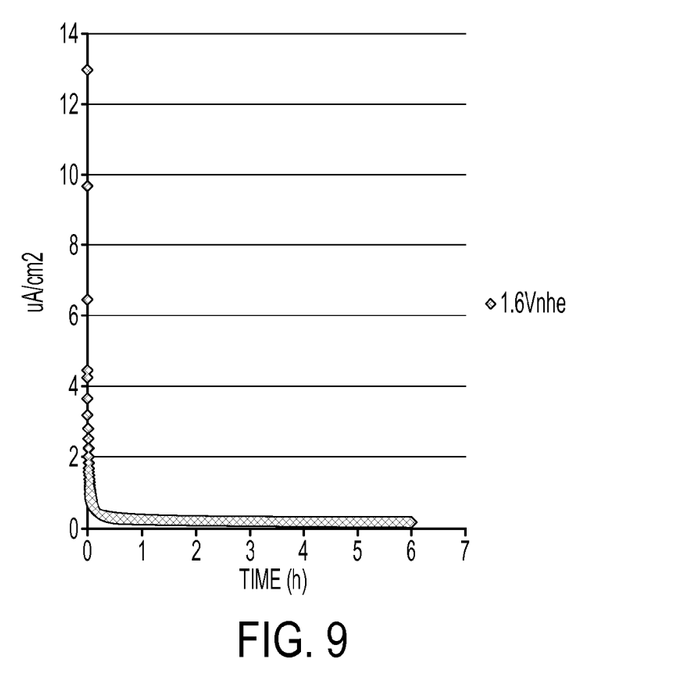

In addition to cyclic-voltammetry, constant potential corrosion testing was performed on the same sample tested in FIG. 6. FIGS. 8 and 9 show the results of these corrosion tests conducted at 80° C. in a H$_2$SO$_4$ solution having a pH of 3 with air bubbled at 100 ml/min. The tests were performed at 0.8 Vnhe, 1.2 Vnhe, and 1.6 Vnhe. As shown in the graphs, the current density curves are very flat over time, indicating that the multi-layer coating renders the plate substantially non-responsive to the stress condition. In addition, the corrosion currents are extremely low at 0.006 µA/cm$^2$, 0.03 µA/cm$^2$, and 0.18 µA/cm$^2$ at 0.8 Vnhe, 1.2 Vnhe, and 1.6 Vnhe, respectively. In comparison, the corrosion current for a gold coating on stainless steel (e.g., like the sample tested in FIG. 7) is about 20 times greater than the current for the disclosed multi-layer coating. This testing confirms that the multi-layer coating is very stable and very corrosion resistant.

Figure 10:
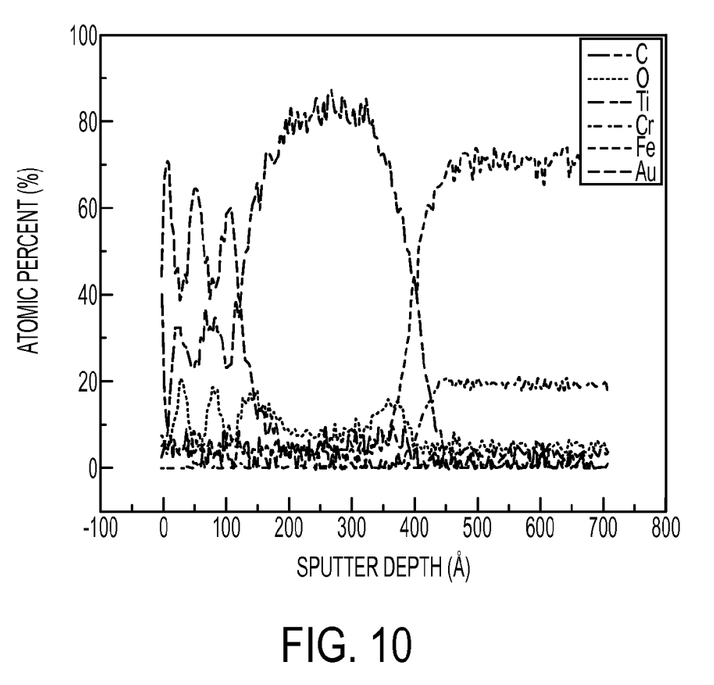
FIGS. 10 and 11 are the results of Auger electron spectroscopy (AES) before (FIG. 10) and after (FIG. 11) corrosion testing.
Figure 11:
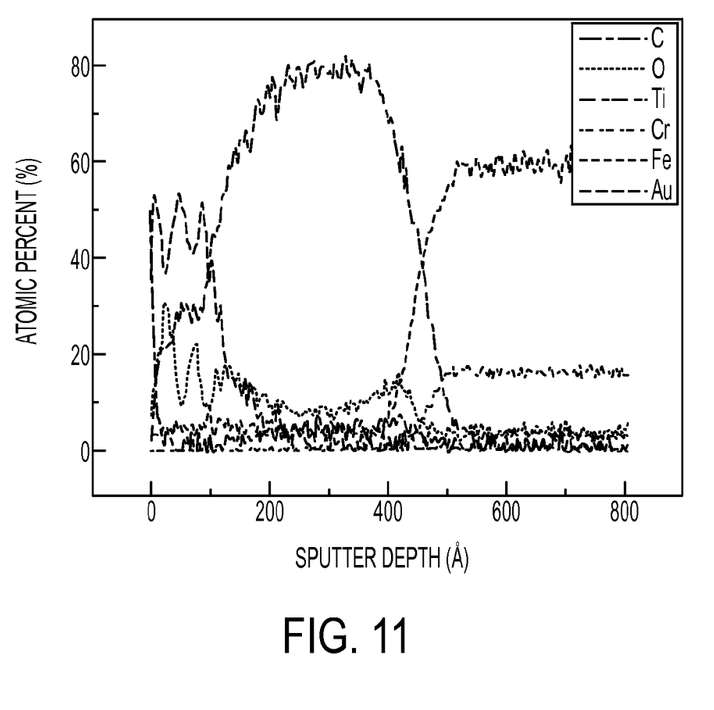

Auger electron spectroscopy (AES) was performed prior to and after the corrosion testing to further confirm the structure and effectiveness of the multi-layer coating. FIG. 10 shows the results of the pre-testing AES analysis. The three gold peaks and first two titanium peaks confirm the formation of alternating layers of gold and titanium on the steel substrate. The third, large titanium peak confirms the formation of a thicker (about 30 nm) titanium layer contacting the steel substrate. FIG. 11 shows the results of the post-testing AES analysis. The gold peaks remain intact, however, the titanium layers have undergone some oxidation as a result of the corrosion testing, as indicated by the increased oxygen concentration (particularly in the first Ti layer). Importantly, the oxygen concentration in the steel layer remains unchanged in the post-testing AES analysis, indicating that the steel substrate has not been affected by the corrosion test. The AES analysis confirms that the multi-layer coating worked as intended, with the Ti layers (particularly the first) oxidizing and blocking further penetration of oxygen into the coating.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell bipolar plate, comprising:
a metal substrate;
a first oxide-forming metal layer contacting the metal substrate;
a first metal elution resistant layer contacting the first oxide-forming metal layer;
a second oxide-forming metal layer contacting the first metal elution resistant layer;
a second metal elution resistant layer contacting the second oxide-forming metal layer having an exposed surface;
a pinhole extending through at least the first oxide-forming metal layer, the first metal elution resistant layer, the second oxide-forming metal layer and the second metal elution resistant layer to form an exposed surface end, a first oxide-forming metal layer end, and a void defined therebetween; and
an oxide plug disposed in the first metal layer and plugging the first oxide-forming metal layer end of the pinhole to reduce metal ions from eluting from the metal substrate through the opening and exposed surface end.

2. The bipolar plate of claim 1, wherein the oxide-forming metal layers include titanium that is doped or alloyed with one or more of niobium, zirconium, vanadium, silver, tantalum, yttrium, scandium, and nitrogen.

3. The bipolar plate of claim 1, wherein the metal elution resistant layers include one or more of gold, iridium, ruthenium, and tantalum.

4. The bipolar plate of claim 1, wherein the metal substrate includes stainless steel.

5. The bipolar plate of claim 1, wherein each layer has a thickness and the thickness of the first oxide-forming metal layer is greater than the thickness of each other layer.

6. The bipolar plate of claim 5, wherein the first oxide-forming metal layer has a mean thickness of 5 to 100 nm and each other layer has a mean thickness of 0.5 to 20 nm.

7. The bipolar plate of claim 1 further comprising:
a third oxide-forming metal layer contacting the second metal elution resistant layer; and
a third metal elution resistant layer contacting the third oxide-forming metal layer.

8. The bipolar plate of claim 1, wherein the has a diameter of 0.1 to 50 nm.

9. The bipolar plate of claim 1, wherein the oxide-forming layers metal consist essentially of pure titanium, doped titanium, or a titanium alloy.

10. The bipolar plate of claim 1, wherein the oxide-forming metal layers are formed of at least 80 wt % titanium.

11. The bipolar plate of claim 1, wherein the metal elution resistant layers include at least 95 wt % of the noble metal or tantalum.

12. The bipolar plate of claim 1, wherein a combined thickness of the metal elution resistant layers is 8 nm or less.

13. A fuel cell bipolar plate, comprising:
a steel substrate;
a coating contacting the steel substrate, the coating including a plurality of alternating oxide-forming metal layers and metal elution resistant layers and a first oxide-forming metal layer closer to the substrate than the other layers of the plurality;
a pinhole extending through each of the plurality of layers; and
an oxide plug disposed in the first oxide-forming metal layer and plugging the pinhole.

14. The bipolar plate of claim 13, wherein there are 2 to 20 layers each of the oxide-forming metal layers and the metal elution resistant layers.

15. The bipolar plate of claim 13, wherein the first oxide-forming metal layer in the plurality of alternating layers has a mean thickness of 5 to 100 nm and is a thickest layer of the plurality of alternating layers and each other layer has a mean thickness of 0.5 to 20 nm.

16. The bipolar plate of claim 13, wherein the oxide-forming metal layers include titanium that is doped or alloyed with one or more of niobium, zirconium, vanadium, silver, tantalum, yttrium, scandium, and nitrogen.

17. A method comprising:
applying a plurality of alternating layers of an oxide-forming metal material and a metal elution resistant material to a metal substrate to form a pinhole extending through each of the plurality of layers, the plurality includes a first oxide-forming metal layer closer to the substrate than the other layers of the plurality; and
forming an oxide plug in the first oxide-forming metal layer to plug the pinhole.

18. The method of claim 17, wherein at least four layers each of the oxide-forming metal material and the metal elution resistant material are applied to the substrate.

19. The method of claim 17, wherein the oxide-forming metal material includes titanium that is doped or alloyed with one or more of niobium, zirconium, vanadium, silver, tantalum, yttrium, scandium, and nitrogen and the metal elution resistant material includes one or more of gold, iridium, ruthenium, and tantalum.

20. The method of claim 17, wherein the first layer of the plurality of alternating layers includes the oxide-forming metal material and is deposited with a first mean thickness of 5 to 100 nm and each subsequent layer is deposited with a mean thickness of 0.5 to 20 nm that is smaller than the first mean thickness.

* * * * *